H. W. & A. L. FISHER.
GREASE GUN.
APPLICATION FILED MAR. 27, 1915.
1,165,083. Patented Dec. 21, 1915.
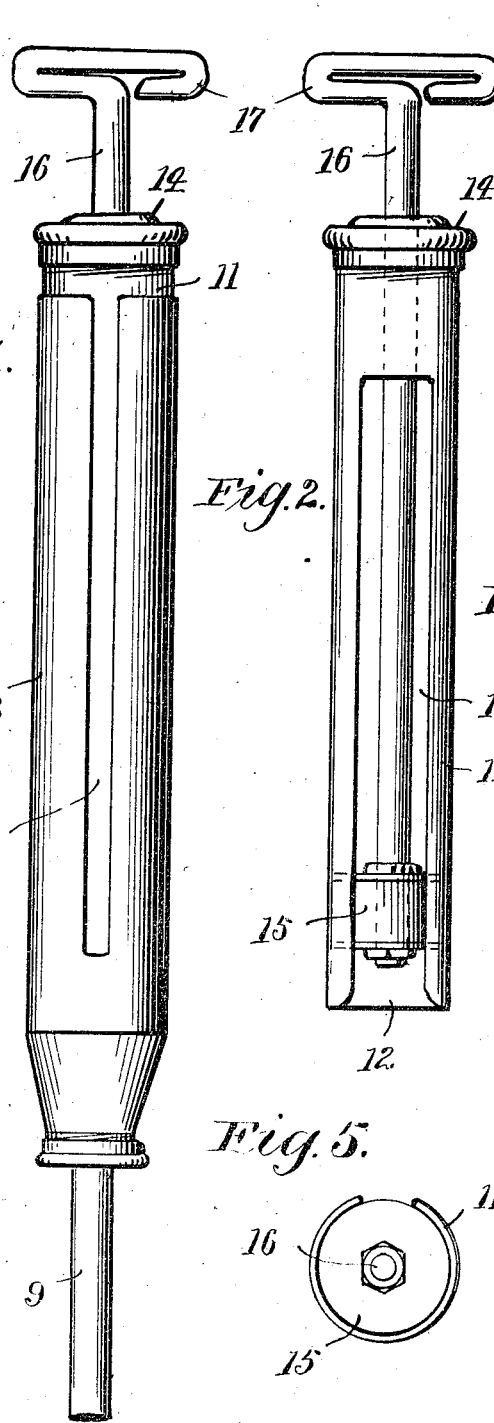
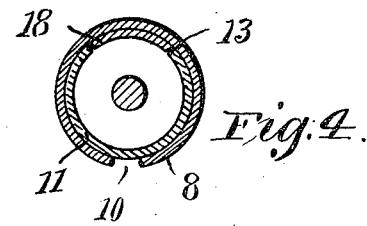
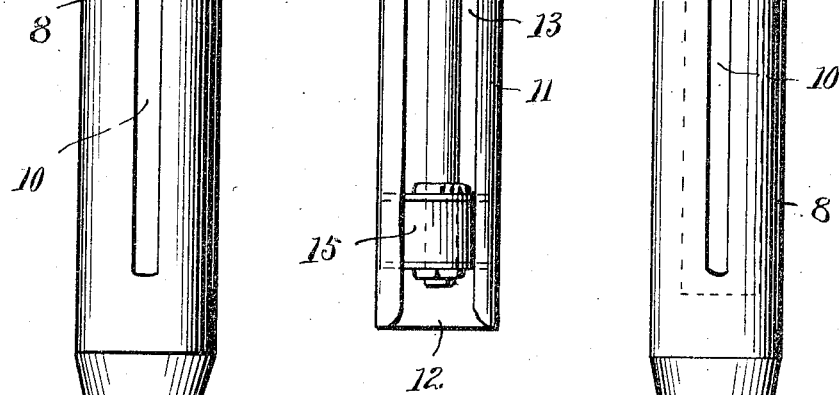
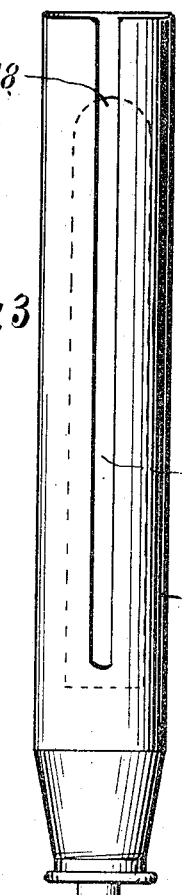
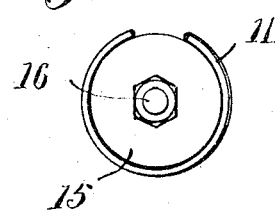
Witnesses
Inventors
Henry W. Fisher and
Albert L. Fisher
By Chamberlain & Newman
Attorneys

UNITED STATES PATENT OFFICE.

HENRY W. FISHER AND ALBERT L. FISHER, OF BRIDGEPORT, CONNECTICUT.

GREASE-GUN.

1,165,083.  Specification of Letters Patent.  Patented Dec. 21, 1915.

Application filed March 27, 1915. Serial No. 17,324.

*To all whom it may concern:*

Be it known that we, HENRY W. FISHER and ALBERT L. FISHER, citizens of the United States, and residents of Bridgeport, in the county of Fairfield and State of Connecticut, have invented certain new and useful Improvements in Grease-Guns, of which the following is a specification.

This invention relates to new and useful improvements in grease guns such as are employed for injecting grease and oil into automobile transmissions, bearings and the like.

The object of the invention is to improve upon the present commercial types of grease gun by providing a construction which can more readily be filled and recharged with grease from time to time as occasion may require and further to design the device as to allow of it being made of sheet metal in a practical and inexpensive way and finally to provide a gun the barrel of which is formed of two parts that are telescopically connected together to form an inclosed cylinder; to further construct these parts so that the same will be retained in proper alinement one with the other and so that they will yieldably and snugly fit together in a way to form a grease tight compartment which though tightly closed when assembled may nevertheless be pulled apart for the purpose of recharging.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1 shows a side elevation of our improved form of grease gun complete. Fig. 2 is a side view of the inner cylindrical member and plunger detached from the outer tube. Fig. 3 is a further side view of the outer cylindrical member of the grease gun as it appears when disconnected from the part shown in Fig. 2. Fig. 4 shows a transverse cross section taken on line 5—5 of Fig. 1. Fig. 5 is an end view of the construction shown in Fig. 2. Fig. 6 shows a cross section of a modified form of outer tube.

As before stated the grease gun consists of an outer and an inner tubular shell or member which are telescopically connected together to form a common barrel and in which a reciprocating plunger is designed to operate in the act of forcing the grease from the barrel out of the reduced or nozzle end of the gun.

Referring in detail to the characters of reference marked upon the drawings 8 represents the outer tubular sheet metal member of the gun which is in the form of an elongated tube the outer end of which is contracted and includes a reduced extension to form a nozzle 9. An elongated slot 10 is formed in one side of the tube to allow the same to yield as occasion may require when the inner tube is inserted.

11 represents the inner tube which like the outer tube is formed of sheet metal and includes an inner open end 12, an elongated filling opening 13 formed in the side of the tube, and a removable cap 14 that serves to inclose the outer end of the tube. The filling opening as will be noted extends from the open end of the tube up to the closed end so that when the inner tube is drawn out from the outer tube it leaves this opening clearly exposed so that the grease may be readily inserted through the opening. This opening also lends flexibility to the side walls of the tube so as to permit it to be readily inserted into the outer shell and in a manner to form a tight inclosure when the two members are shoved together.

15 represents the plunger which as will be noted is mounted upon a rod 16 having a handle 17 formed upon its outer end. This plunger or piston is fitted to the inner tube and is designed to be shoved back and forth in a manner to force the grease from the inner tube out through the nozzle 9 of the outer tube.

Upon the inner wall of the outer tube is secured an elongated shoulder 18 which extends practically the length of the tube and serves as a guide for the inner tube and also to fill the space or the opening in the side of the inner tube so that when the two tubes are assembled the inner walls of the gun will represent a circle and will be of an equal diameter so that a continuous cylindrical wall will be formed and against which the piston operates and so that the operation of the latter will insure the forcing of all grease forward and not allow any of it to work back past the piston. The shoulder 18 may be formed by securing a concave sheet metal strip to the inside of the outer tube 8 as shown in Figs. 3 and 4 or it may be produced by stamping in the side wall of the tube as shown in Fig. 6. In both instances the inner edge of the elongated shoulder fits between the opposite edges of the inner tube.

Having thus described our invention what we claim and desire to secure by Letters Patent is:—

1. A grease gun comprising an inner and an outer tubular member adapted to slidably fit one into the other the inner member being provided with an elongated side filling opening which is exposed when the tubes are pulled apart, the outer tube being provided upon its inside with a longitudinal shouldered guide rib that fits the longitudinal side opening in the inner tube in a manner to fill the opening to prevent the tubes from turning with relation to each other, a piston fitted in the inner tube, and an operating rod upon which the piston is mounted.

2. A grease gun comprising an inner tubular container and an outer tubular covering member that telescopically fit together and having both of their uniting ends open, the inner tube being provided with an elongated side filling opening that opens into the open end of the container, a rod fitted to operate through the closed end of the inner tube, means carried by the outer tube to fill the side opening of the container when the two tubes are closed together, and a piston carried upon the inner end of the said rod and fitted in the said inner tube.

3. A grease gun comprising an inner and an outer tubular member adapted to fit one into the other, the inner member being provided with a side filling opening which is exposed when the tubes are pulled out, the outer tube being provided upon its inside with a longitudinal shouldered rib to fit the longitudinal side opening in the inner tube, one of the said tubes being provided with an elongated slot in its side that extends in from the open end of the tube to permit the side walls of the tube to spring and form a tight fit with the other tube, a plunger fitted in the inner tube and an operating rod upon which the plunger is mounted.

4. A grease gun comprising an inner and an outer tubular member that telescopically fit together and having both of their uniting ends open, the outer member being provided with an internal longitudinal shoulder and a nozzle at one end, the other tube being provided with an elongated filling opening to receive the said shoulder and form a complete cylindrical wall in the container tube to receive the piston, a rod and piston adapted to operate in the inner tube in a manner to force the grease from the nozzle of the gun.

Signed at Bridgeport in the county of Fairfield and State of Connecticut this 24 day of March A. D. 1915.

HENRY W. FISHER.
ALBERT L. FISHER.

Witnesses:
C. M. NEWMAN,
RUTH M. W. KOGER.